US012791707B2

(12) United States Patent
Izumi et al.

(10) Patent No.: US 12,791,707 B2
(45) Date of Patent: Nov. 10, 2026

(54) OBJECT DETECTION DEVICE AND OBJECT DETECTION METHOD

(71) Applicant: Panasonic Automotive Systems Co., Ltd., Kanagawa (JP)

(72) Inventors: Yoshiki Izumi, Osaka (JP); Tadashi Morita, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 56 days.

(21) Appl. No.: 18/823,424

(22) Filed: Sep. 3, 2024

(65) Prior Publication Data

US 2024/0418856 A1 Dec. 19, 2024

Related U.S. Application Data

(63) Continuation of application No. PCT/JP2023/001806, filed on Jan. 20, 2023.

(30) Foreign Application Priority Data

Mar. 7, 2022 (JP) ................................ 2022-034547

(51) Int. Cl.
*G01S 15/08* (2006.01)
*G01S 7/00* (2006.01)
(Continued)

(52) U.S. Cl.
CPC .............. *G01S 15/08* (2013.01); *G01S 7/003* (2013.01); *G01S 15/003* (2013.01); *G01S 15/931* (2013.01)

(58) Field of Classification Search
CPC ........ G01S 15/08; G01S 7/003; G01S 15/003; G01S 15/931; G01S 13/862; G01S 7/524; G01S 15/87
(Continued)

(56) References Cited

U.S. PATENT DOCUMENTS 6,279,396 B1 * 8/2001 Imagawa ................ G01S 7/529
73/1.79
2017/0264423 A1 * 9/2017 Hirotsu .................. H04L 69/28
(Continued)

FOREIGN PATENT DOCUMENTS

JP H109846 A 1/1998
JP 2003279651 A 10/2003
(Continued)

OTHER PUBLICATIONS

English translation of JP-2005024255-A (Year: 2005).*
(Continued)

*Primary Examiner* — Ramya P Burgess
*Assistant Examiner* — Preston Jay Miller
(74) *Attorney, Agent, or Firm* — Seed Intellectual Property Law Group LLP

(57) ABSTRACT

An object detection device according to the present disclosure includes: wave transmission/reception circuits which, in operation, detect a received wave transmitted to and reflected from an object; and a processing circuit connected to the wave transmission/reception circuits. Each of the wave transmission/reception circuits includes a timing circuit which, in operation, measures time by using time adjusted based on time adjustment information, and a wave transmission/reception control circuit which, in operation, performs wave transmission or wave reception based on the time measured by the timing circuit. The processing circuit includes: an output circuit which, in operation, outputs the time adjustment information to at least one of the wave transmission/reception circuits; and an object detection circuit which, in operation, detects the object by using distance measurement information based on the wave transmission and the wave reception input from the wave transmission/reception circuits.

15 Claims, 11 Drawing Sheets

(51) Int. Cl.
*G01S 15/00* (2020.01)
*G01S 15/931* (2020.01)

(58) Field of Classification Search
USPC .............................................................. 701/25
See application file for complete search history.

(56) References Cited

U.S. PATENT DOCUMENTS

| | | | | |
|---|---|---|---|---|
| 2017/0294125 | A1 | 10/2017 | Matsuura et al. | |
| 2020/0225345 | A1 | 7/2020 | Ding et al. | |
| 2021/0096247 | A1* | 4/2021 | Ishikawa | G01S 15/325 |
| 2021/0302573 | A1* | 9/2021 | Sugae | B60R 16/0231 |
| 2021/0341603 | A1* | 11/2021 | Park | G06N 3/044 |
| 2023/0271628 | A1* | 8/2023 | Watts | G06V 10/87<br>701/28 |

FOREIGN PATENT DOCUMENTS

| | | | | | |
|---|---|---|---|---|---|
| JP | 2005024255 | A | * | 1/2005 | |
| JP | 2016085036 | A | * | 5/2016 | G01S 15/10 |
| JP | 2021063665 | A | | 4/2021 | |
| WO | WO 2016063523 | A1 | | 4/2016 | |

OTHER PUBLICATIONS

English translation of JP-2016085036-A (Year: 2016).*
International Search Report and Written Opinion, dated Mar. 7, 2023, for Japanese Patent Application PCTJP2023001806. (11 pages) (with English translation).
Notice of Reasons for Refusal, dated Mar. 10, 2026, for Japanese Patent Application No. 2024-505933. (7 pages) (with English Translation).

* cited by examiner

FIG.2

T

T1

| TIME [ms] (t1) | NUMBER (t2) | WAVE TRANSMISSION AND WAVE RECEPTION (t3) |
|---|---|---|
| 50 | 1<br>2 | WAVE TRANSMISSION + WAVE RECEPTION<br>WAVE RECEPTION |
| 100 | 2<br>1, 3 | WAVE TRANSMISSION + WAVE RECEPTION<br>WAVE RECEPTION |
| 150 | 3<br>2, 4 | WAVE TRANSMISSION + WAVE RECEPTION<br>WAVE RECEPTION |
| | ... | |
| | | |

T2

| TIME [ms] (t1) | NUMBER (t2) | WAVE TRANSMISSION AND WAVE RECEPTION (t3) |
|---|---|---|
| 50 | 1 | WAVE TRANSMISSION + WAVE RECEPTION |
| 100 | 1 | WAVE RECEPTION |
| | | |
| | ... | |
| | | |

OBJECT DETECTION DEVICE AND OBJECT DETECTION METHOD

CROSS-REFERENCE TO RELATED APPLICATIONS

This application is a continuation of International Application No. PCT/JP2023/001806, filed on Jan. 20, 2023 which claims the benefit of priority of the prior Japanese Patent Application No. 2022-034547, filed on Mar. 7, 2022, the entire contents of which are incorporated herein by reference.

FIELD

Embodiments described herein relate generally to an object detection device and an object detection method.

BACKGROUND

An existing technique of a vehicle includes an object detection method of detecting a surrounding object by transmitting and receiving ultrasonic waves by a sonar module (e.g., JP H10-009846 A and WO 2016/063523 A).

When detecting an object by triangulation, a vehicle uses a plurality of wave transmission/reception circuits such as a sonar module so that waves can be transmitted and received at a plurality of positions. An ECU at the subsequent stage instructs each of the wave transmission/reception circuits to start wave transmission and wave reception in order to align start timings of wave transmission and wave reception between the wave transmission/reception circuits. However, the ECU is integrated, and many other sensors are connected to the ECU. In this case, if the number of communications or a communication amount between the ECU and each the wave transmission/reception circuit remains to be large, it is likely that the number of communications or the communication amount becomes a factor of functional restriction of the ECU.

The present disclosure provides an object detection device and an object detection method in which a plurality of wave transmission/reception circuits are capable of transmitting and receiving ultrasonic waves or the like while autonomously aligning start timings.

SUMMARY

An object detection device according to an embodiment of the present disclosure includes a plurality of wave transmission/reception circuits which, in operation, detects a received wave transmitted to and reflected from an object; and a processing circuit connected to the wave transmission/reception circuits. Each of the wave transmission/reception circuits includes: a timing circuit which, in operation, measures time by using time adjusted based on time adjustment information; and a wave transmission/reception control circuit which, in operation, performs wave transmission or wave reception based on the time measured by the timing circuit. The processing circuit includes: an output circuit which, in operation, outputs the time adjustment information for adjusting time to at least one wave transmission/reception circuit of the plurality of wave transmission/reception circuits; and an object detection circuit which, in operation, detects the object by using distance measurement information based on the wave transmission and the wave reception input from the plurality of wave transmission/reception circuits.

BRIEF DESCRIPTION OF THE DRAWINGS

FIG. 2 is a diagram illustrating an example of procedure information of a wave transmission/reception procedure stored in a memory circuit of the object detection device according to the embodiment;

DETAILED DESCRIPTION

Figure 1A:
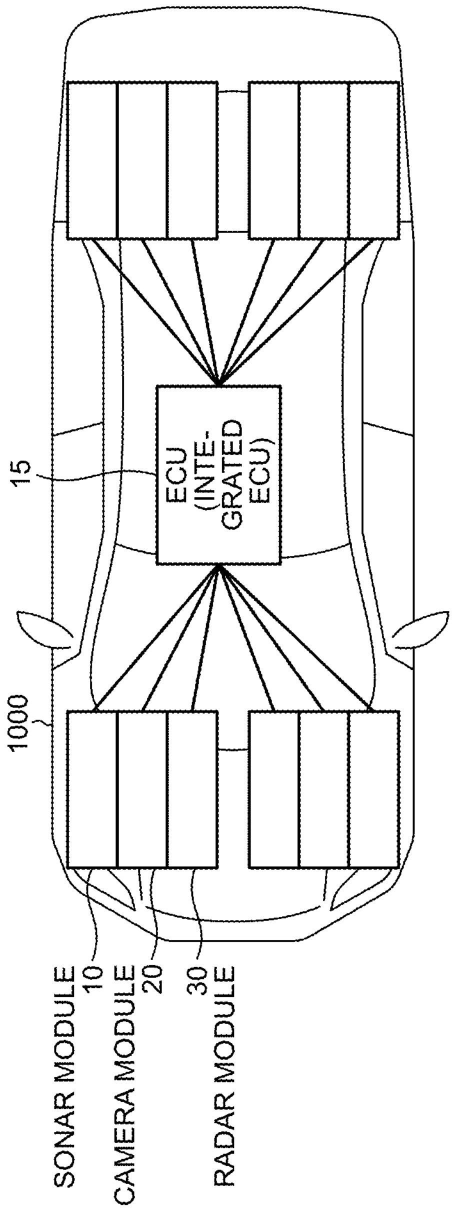
FIG. 1A is a diagram illustrating an example of an arrangement configuration of a sonar module of a vehicle to which an object detection device according to an embodiment is applied.

Hereinafter, embodiments of an object detection device and an object detection method according to the present disclosure are described in detail with reference to the accompanying drawings. Note that, in the present specification and drawings, components having substantially the same function are denoted by the same reference numerals, and redundant description is omitted.

Embodiment

Hereinafter, a sonar module using ultrasonic waves is described as an example of a "wave transmission/reception circuit". Note that the "wave transmission/reception circuit" is not limited to the sonar module as long as a position of an object can be detected in a "processing circuit" at the subsequent stage. For example, the "wave transmission/reception circuit" may be a radar module.

In the present embodiment, an electronic control unit (ECU) of a vehicle is described as an example of the "processing circuit" at the subsequent stage. Also, in the present embodiment, a mode in which the ECU includes a vehicle control circuit and an object position detection function is described as an example. Note that the ECU may be an integrated ECU 15 to which a large number of modules such as a camera module 20 and a radar module 30 are connected in addition to a sonar module 10 as illustrated in a vehicle 1000 of FIG. 1A. It is currently estimated that, for example, 12 modules will be connected to the integrated ECU 15 in the future.

System Configuration of Object Detection Device

The object detection device according to the present embodiment includes a plurality of sonar modules 10 and includes a unit for causing each of the sonar modules 10 to autonomously transmit and receive waves individually. In addition, the object detection device includes a unit for detecting an object position around the vehicle 1000 based on distance measurement information output from each sonar module 10.

A configuration of an object detection device 1 that is an example of the object detection device of the present embodiment is described in detail with reference to FIG. 1B. Note that FIG. 1B illustrates a configuration of one sonar module 10 among the plurality of sonar modules 10 mounted on the vehicle 1000. Although not illustrated in FIG. 1B, other sonar modules 10 can be implemented with the same configuration.

The sonar module 10 includes a microphone 100 and a resonance circuit 110 and autonomously transmits and receives waves under the control of an IC 120.

The IC 120 is an integrated circuit including an analog control circuit 121, an ADC 122, a distance measurement circuit 123, a microcomputer 124, a timing circuit 125, a memory circuit 126, an I/F 127, and the like.

The microcomputer 124 is a microcontroller having a microprocessor. The microcomputer 124 corresponds to a "wave transmission/reception control circuit". The microcomputer 124 controls the analog control circuit 121 according to a wave transmission/reception procedure based on a time counted by the timing circuit 125. Under the control of the microcomputer 124, the sonar module 10 autonomously transmits and receives waves.

The memory circuit 126 stores procedure information T in which the wave transmission/reception procedure of the microcomputer 124 is set. The memory circuit 126 is, for example, a nonvolatile memory circuit.

The timing circuit 125 is a clock configured with, for example, a logic IC. The timing circuit 125 measures a timing of the start of wave transmission/reception. When time adjustment information 1501 transmitted from the ECU 15 at the subsequent stage is set from the microcomputer 124, the timing circuit 125 adjusts a time deviation based on the set time adjustment information.

The resonance circuit 110 is operated by the analog control circuit 121 and transmits an ultrasonic wave from the microphone 100. A reflected wave from the object is detected by being received by the microphone 100 and being input to the distance measurement circuit 123 via the ADC 122.

The ADC 122 is an analog-to-digital converter and converts a received wave signal received by the microphone 100 from an analog signal to a digital signal.

The distance measurement circuit 123 measures a distance to an object based on the received wave signal converted into the digital signal and outputs distance measurement information to the microcomputer 124.

The I/F 127 is an interface circuit with the ECU 15 connected to the subsequent stage. The I/F 127 inputs the time adjustment information 1501 output from the ECU 15 at the subsequent stage to the microcomputer 124 and outputs distance measurement information 1502 from the microcomputer 124 to the ECU 15. The connection between the I/F 127 and the ECU 15 may be either wired connection or wireless connection.

The ECU 15 includes an object detection circuit 150, a time adjustment circuit 151 that outputs the time adjustment information 1501, and a vehicle control circuit 152.

The time adjustment circuit 151 outputs the time adjustment information 1501 to the microcomputer 124 of each sonar module 10 via the I/F 127. The time adjustment circuit 151 corresponds to an "output circuit".

The object detection circuit 150 detects the position of the object based on the input distance measurement information 1502 by inputting the distance measurement information 1502 output from the I/F 127. As an example, the object detection circuit 150 detects the position of the object by detecting coordinates of the object by triangulation or the like from the distance measurement information 1502 output from the plurality of sonar modules 10. Furthermore, the object detection circuit 150 may have other functions such as performing collision determination from a detected positional relationship between the vehicle 1000 and an object.

The vehicle control circuit 152 is a control circuit that controls the vehicle 1000. The vehicle control circuit 152 controls the vehicle 1000 based on input from each unit of the vehicle 1000. When the collision determination result between the vehicle 1000 and the object is input from the object detection circuit 150, the vehicle control circuit 152 performs control for avoiding collision between the vehicle 1000 and the object based on the input.

Procedure Information

Table information T1 or table information T2 illustrated in FIG. 2 corresponds to the procedure information T. Each sonar module 10 may store the same table information related to each sonar module 10 in the memory circuit 126 of each sonar module 10 or may store an individual piece of table information related to each sonar module 10.

The table information T1 illustrated in FIG. 2 is an example of setting of table information when the same table information related to each sonar module 10 is stored in each sonar module 10. The table information T2 illustrated in FIG. 2 is an example of setting of table information of one sonar module 10 when an individual piece of table information related to each sonar module 10 is stored in each sonar module 10.

The table information T1 is table information in which data of "time" t1, "number" t2, and "wave transmission and wave reception" t3 are associated with each other. In chronological order of the time set in the "time" t1, data indicating an identification number of the sonar module 10 operated at each time is set in the "number" t2, and data indicating an operation method of the sonar module 10 set in the "number" t2 is set in the "wave transmission and wave reception" t3. In the example illustrated in the table information T1 of FIG. 2, "50" ms (milliseconds), "100" ms, "150" ms, and the like are set to the "time" t1. In association with "50" ms of "time" t1, an identification number "1" and an identification number "2" are set in the "number" t2, and "wave transmission+wave reception" indicating an operation method corresponding to the identification number "1" and "wave reception" indicating an operation method corresponding to the identification number "2" are set in the "wave transmission and wave reception" t3. In "100" ms, "150" ms, and the like, data is set to the "number" t2 and the "wave transmission and wave reception" t3 in the same manner as in "50" ms.

Among the plurality of sonar modules 10, the sonar module 10 with the identification number "1" autonomously operates individually based on the setting of the identification number "1" set in the "number" t2 of the table information T1. For example, in the example of the table information T1, the sonar module 10 with the identification number "1" autonomously transmits and receives waves individually at time 50 ms. In addition, the sonar module 10 with the identification number "2" autonomously receives waves individually at time 50 ms.

Subsequently, at time 100 ms, the sonar module 10 with the identification number "2" autonomously transmits and receives waves individually. In addition, the sonar modules 10 with the identification number "1" and an identification number "3" autonomously receive waves individually. The sonar module 10 with the identification number "3" autonomously transmits and receives waves individually at time 150 ms. Also, the sonar modules 10 with the identification number "2" and an identification number "4" autonomously transmit and receive waves individually.

The table information T2 illustrated in FIG. 2 is an example of setting of an individual piece of table information stored in the sonar module 10 with the identification number "1" as an example. In the individual piece of table information, the identification number "1" of the sonar module 10 is set as the "number" t2. As described above, when the individual piece of setting information is stored in the sonar module 10, each sonar module 10 autonomously operates individually based on each piece of table information.

Operation Procedure

Figure 3:
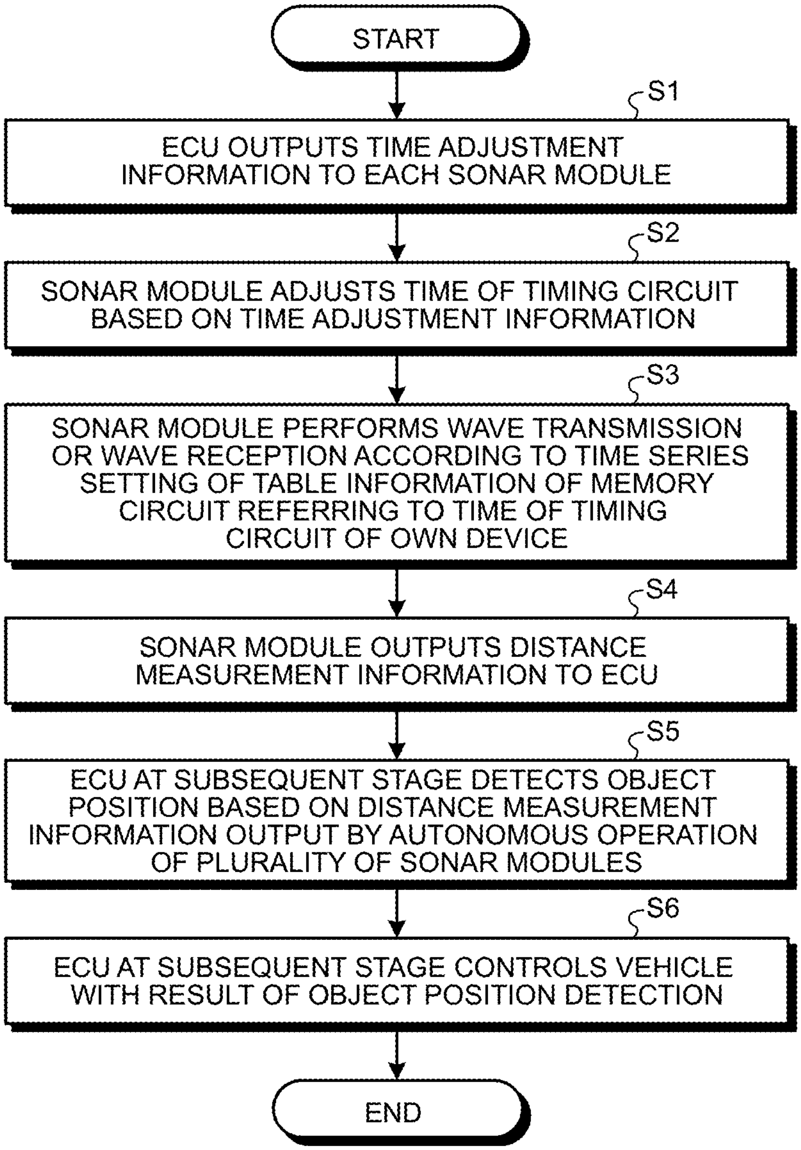
FIG. 3 is a view illustrating an example of an operation procedure of the object detection device according to the embodiment.

As illustrated in FIG. 3, first, the ECU 15 outputs the time adjustment information 1501 to each sonar module 10 (step S1), and the sonar module 10 adjusts the time of the timing circuit 125 based on the time adjustment information 1501 (step S2). The cycle in which the ECU 15 outputs the time adjustment information 1501 may be freely set. Note that, although the cycle in which the ECU 15 outputs the time adjustment information 1501 is freely set, the time adjustment information 1501 is information on time adjustment for adjusting a time deviation that occurs over time in the timing circuit 125, and thus the cycle is considerably longer than the interval at which the sonar module 10 transmits and receives waves every several tens of milliseconds.

Next, the sonar module 10 transmits or receives waves according to the time series setting of the table information of the memory circuit 126 with reference to the time of the timing circuit 125 of the own device. Specifically, when the time output from the timing circuit 125 is the time set to the "time" t1 of the table information T1 or the table information T2 and the identification number of the own device is set at the corresponding time, the sonar module 10 autonomously transmits or receives waves individually according to the setting of the "wave transmission and wave reception" t3 corresponding to the identification number of the own device (step S3).

Next, the sonar module 10 outputs the distance measurement information 1502 to the ECU 15 (step S4). In addition, here, the sonar module 10 may also output, to the ECU 15, the time when wave transmission and wave reception starts.

The ECU 15 at the subsequent stage detects an object position based on the distance measurement information 1502 output by autonomous operations of the plurality of sonar modules 10 (step S5). The object position detection is, for example, processing in which the object detection circuit 150 or the like calculates coordinates by triangulation based on a plurality of pieces of distance measurement information 1502 or determines a collision between the vehicle 1000 and an object.

The ECU 15 at the subsequent stage controls the vehicle 1000 with the result of the object position detection (step S6). As an example, when the determination result of the collision between the vehicle 1000 and the object is output from the object detection circuit 150 as the result of the object position detection, the vehicle control circuit 152 controls the vehicle 1000 considering the collision determination result and avoids the collision with the object.

Effects of Embodiment

As described above, in the object detection device 1 according to the embodiment, the plurality of sonar modules 10 adjust time based on the time adjustment information 1501 periodically output from the ECU 15 at the subsequent stage. Also, each sonar module 10 has the procedure information T of wave transmission/reception of the own device. Therefore, each sonar module 10 can autonomously align the start timings of wave transmission and wave reception between the wave transmission/reception circuits of each sonar module 10 and autonomously transmit and receive ultrasonic waves or the like without the ECU 15 transmitting start timings of wave transmission and wave reception to each sonar module 10 every time.

In addition, even when many sensors such as the radar module 30 and the camera module 20 are integrated in the ECU 15 in addition to the sonar module 10, the ECU 15 may output the time adjustment information 1501 from the ECU 15 to the sonar module 10 at a time interval considerably longer than that in the related art, so that the number of communication and the communication amount can be significantly reduced and it is possible to avoid restriction in functions such as object detection and other functions performed by the ECU 15.

First Modification of Embodiment

Although the example in which the ECU 15 outputs the time adjustment information 1501 to each sonar module 10 is described in the embodiment, the ECU 15 may set one sonar module 10 among the plurality of sonar modules 10 as a master and output the time adjustment information 1501 to the master.

Figure 4A:
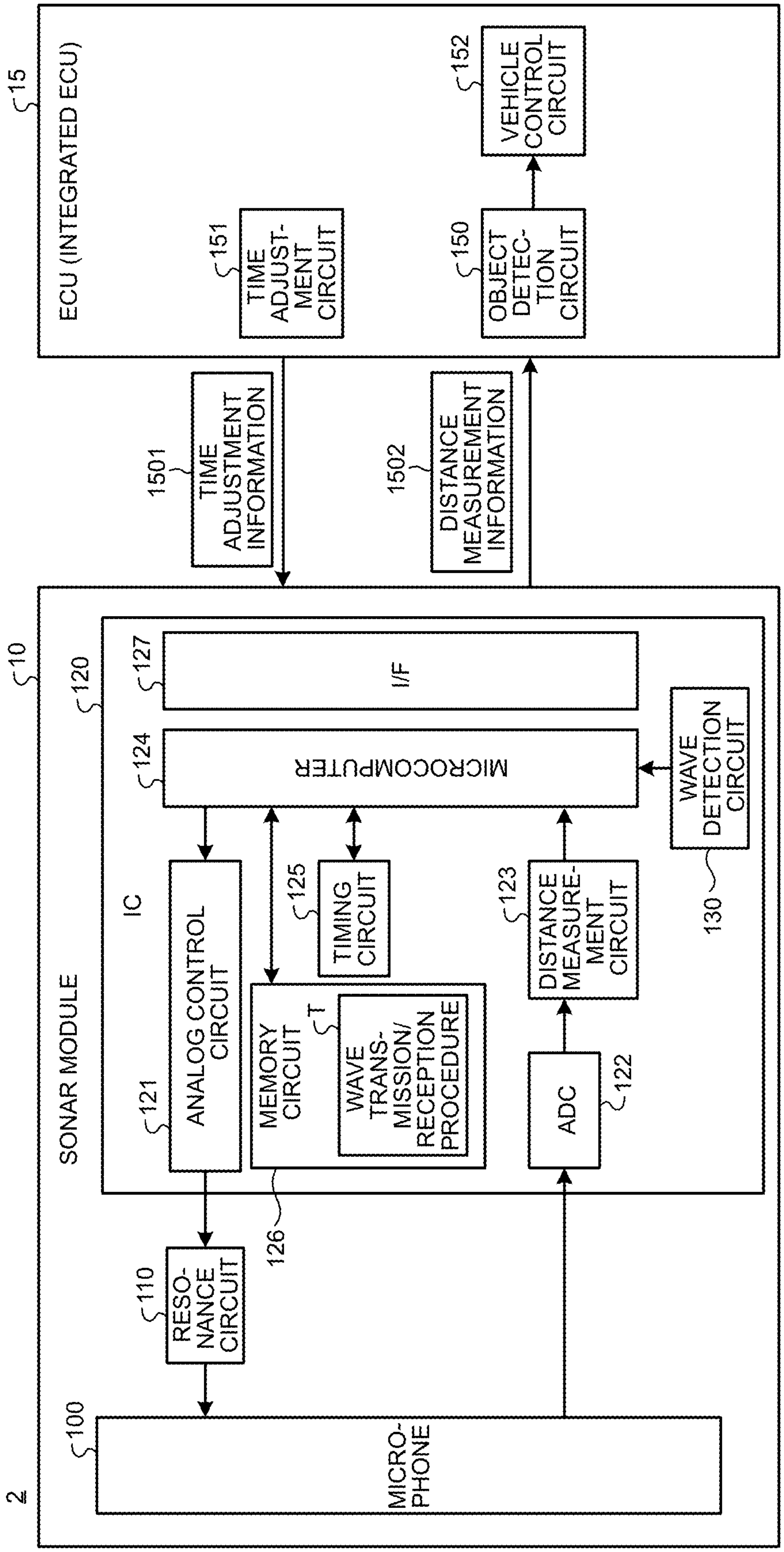
FIG. 4A is a diagram illustrating an example of a configuration of a first modification of the object detection device according to the embodiment.

As illustrated in FIG. 4A, in an object detection device 2 of a first modification, the sonar module 10 includes a wave detection circuit 130. The wave detection circuit 130 is inside the IC 120 in the example illustrated in FIG. 4A but may be disposed outside the IC 120.

When an adjacent sonar module 10 transmits ultrasonic waves, the wave detection circuit 130 detects the transmitted waves to detect the timing of time adjustment. The wave detection circuit 130 inputs, to the microcomputer 124, a detection signal obtained by detecting the wave transmission (a direct wave in the transmission wave) from an adjacent sonar module 10, and the microcomputer 124 sets time adjustment information in the timing circuit 125 and adjusts a time deviation with the input of the detection signal as a trigger.

Figure 4B:
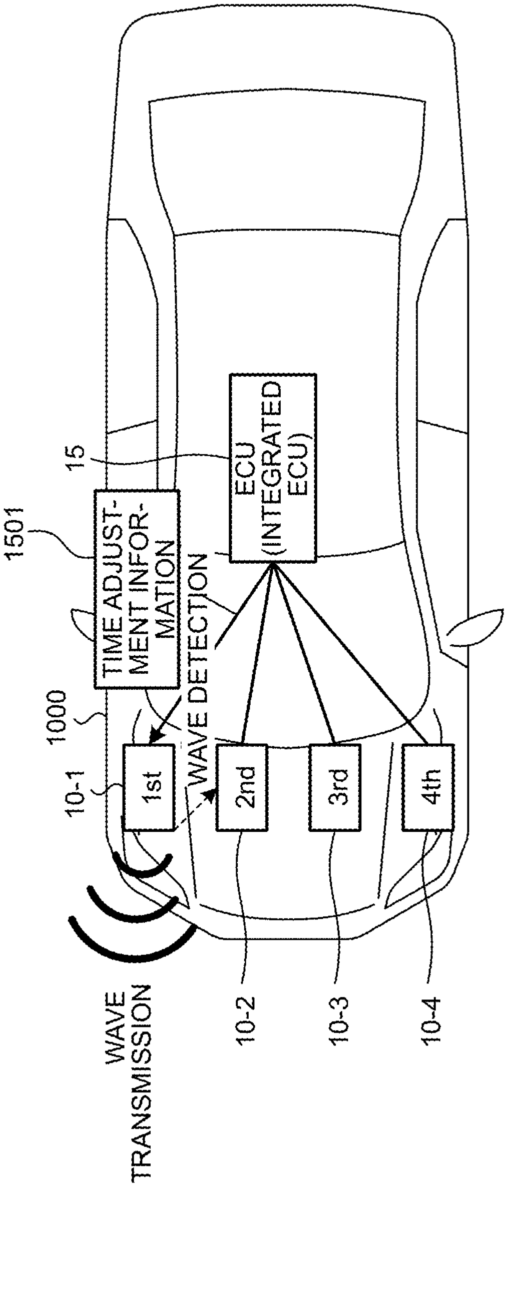
FIG. 4B is a diagram illustrating an example of a time adjustment procedure in the first modification of the object detection device according to the embodiment.

As illustrated in FIG. 4B, when three or more sonar modules 10 are provided in the order of a first sonar module 10-1, a second sonar module 10-2, a third sonar module 10-3, and a fourth sonar module 10-4, for example, the first sonar module 10-1 is set as a master, and the time adjustment information 1501 is output from the ECU 15 to the first sonar module 10-1. Since the first sonar module 10-1 adjusts the time, when the first sonar module 10-1 transmits the ultrasonic wave, the second sonar module 10-2 positioned adjacent to the first sonar module 10-1 detects the direct wave of the transmission of the ultrasonic wave and adjusts the time. Then, when the second sonar module 10-2 transmits an ultrasonic wave, the third sonar module 10-3 positioned adjacent to the second sonar module 10-2 detects a direct wave of transmission of the ultrasonic wave and adjusts the time. Here, as the first sonar module 10-1 and the third sonar module 10-3 are positioned adjacent to the second sonar module 10-2, a rule of ascending order of the (number) may be set as the time adjustment order.

As described above, when each sonar module 10 is provided with the wave detection circuit 130 to adjust the time, the wave detection circuit 130 is disposed to be able to detect not the indirect wave but the direct wave when an adjacent sonar module 10 transmits the wave. Note that the arrangement of the wave detection circuit 130 and the sonar module 10 is an example and is not limited thereto. In addition, four of the first to fourth sonar modules are illustrated as the sonar modules 10, but the arrangement is an example, and the present disclosure is not limited thereto. The number of the sonar modules 10 may be 2, 3, 4, or more.

Effect of First Modification

As described above, in the object detection device 2 according to the first modification, at least one sonar module 10 may adjust time based on the time adjustment information 1501 periodically output from the ECU 15 at the subsequent stage. Therefore, the object detection device 2 according to the first modification can further greatly reduce the number of communication and the communication amount from the ECU 15 to the sonar module 10.

Second Modification of Embodiment

In the first modification, the wave detection circuit 130 is provided, but a communication circuit may be provided so that the sonar modules 10 can communicate with each other.

Figure 5:
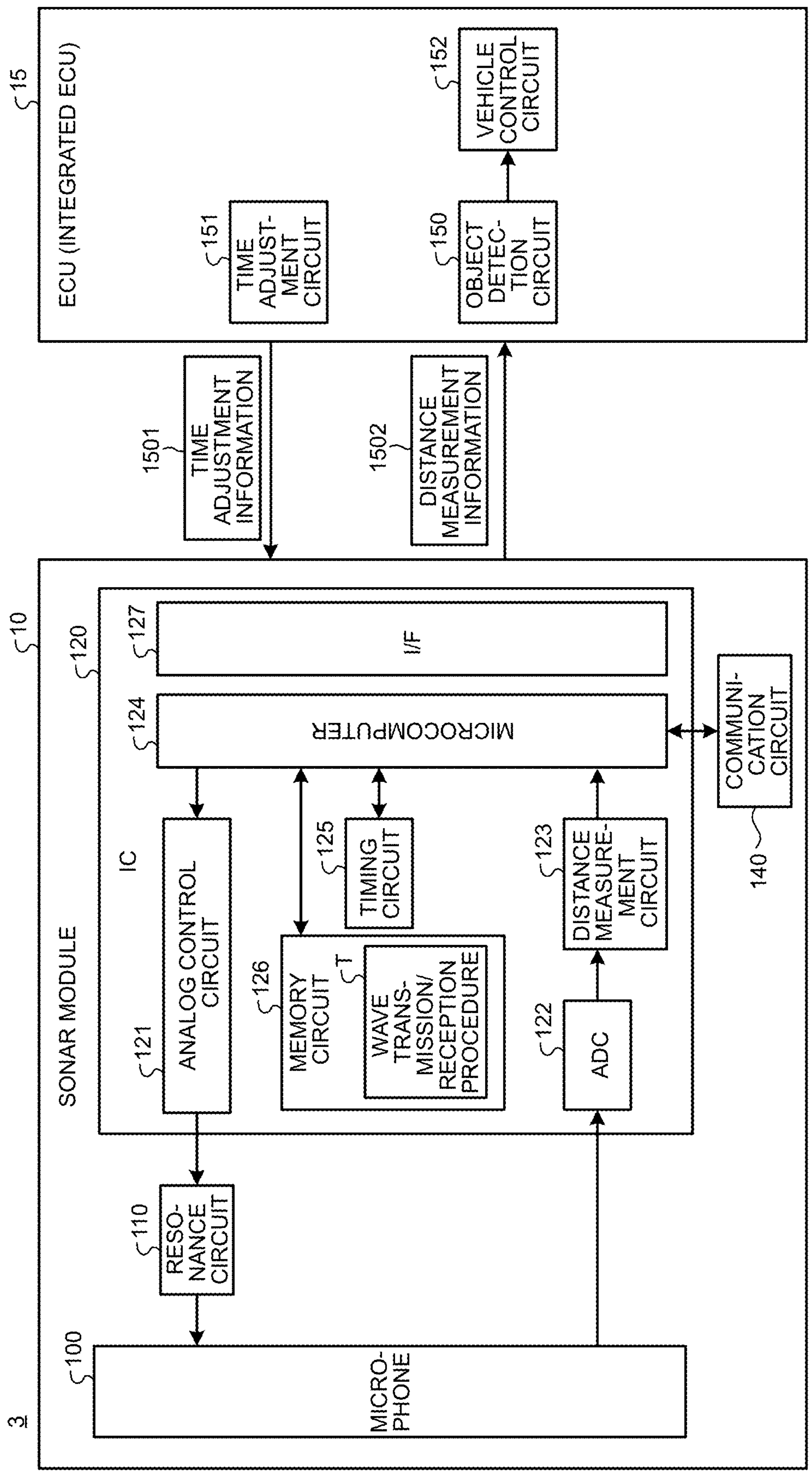
FIG. 5 is a diagram illustrating an example of a configuration of a second modification of the object detection device according to the embodiment.

As illustrated in FIG. 5, in an object detection device 3 of a second modification, each sonar module 10 includes a communication circuit 140.

The communication circuit 140 communicates with the other sonar modules 10 to acquire the time adjustment information for adjusting the time from the other sonar modules 10. Here, when three or more sonar modules 10 are provided in the order of the first, second, and third sonar modules, for example, the time adjustment information 1501 is output from the ECU 15 to the first sonar module 10, and the first sonar module 10 is caused to adjust the time. Each of the second sonar module 10 and the third sonar module 10 communicates with another sonar module 10 through the communication circuit 140 and acquires time adjustment information to adjust the time. Note that the output of the time adjustment information 1501 from the ECU 15 to the first sonar module 10 may be omitted, and for example, information requesting time adjustment may be output from the first sonar module 10 to the second sonar module 10 to cause the second sonar module 10 to adjust the time by the ECU 15.

Note that when the time adjustment information 1501 is output from the ECU 15 to the first sonar module 10, the order of time adjustment performed in the second sonar module 10 and the third sonar module 10 is not limited to the order of numbers as long as each sonar module communicates with the first sonar module 10. In addition, the time adjustment performed in the second sonar module 10 and the third sonar module 10 may be set to be performed in ascending order so that the time adjustment is performed in order of numbers. In addition, the configuration in which each sonar module 10 communicates with the first sonar module 10 is an example, and a procedure in which the second sonar module 10 communicates with the first sonar module 10 to adjust the time, and then the third sonar module 10 communicates with the second sonar module 10 to adjust the time may be used. Note that time adjustment may be performed via the I/F 127.

Effect of Second Modification

The object detection device 3 according to the second modification described above is different from the configuration of the first modification and the like that waits for the wave transmission, and thus it is possible to adjust the time by the communication circuit 140 at a free timing without waiting for the wave transmission.

Third Modification of Embodiment

At the timing of the wave transmission start or the wave reception start, each sonar module 10 also outputs the time to the ECU 15. In the embodiment and each modification, the start time deviation of wave transmission/reception between the sonar modules 10 is adjusted by adjusting the time of each sonar module 10, but it is preferable to further provide a correction circuit for correcting the time deviation of the start time with respect to each piece of the distance measurement information in the ECU 15.

Figure 6:
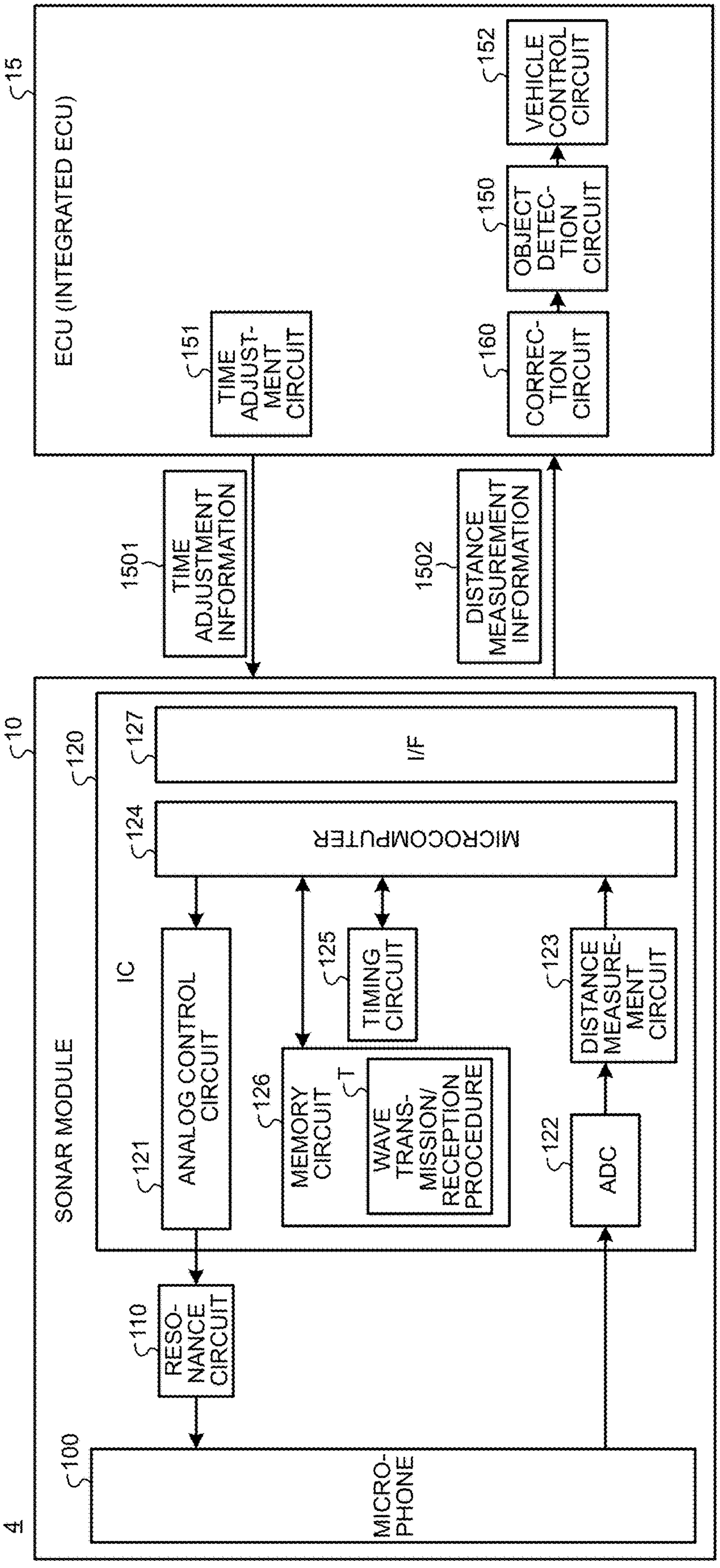
FIG. 6 is a diagram illustrating an example of a configuration of a third modification of the object detection device according to the embodiment.

As illustrated in FIG. 6, an object detection device 4 of a third modification includes a correction circuit 160 in the ECU 15. The correction circuit 160 is a circuit that corrects a time deviation of start time used for each piece of distance measurement information 1502 input from the plurality of sonar modules 10.

The correction circuit 160 calculates a deviation amount of the start time from each sonar module 10 and corrects the distance measurement information output from each sonar module 10 by using the deviation amount.

Figure 7:
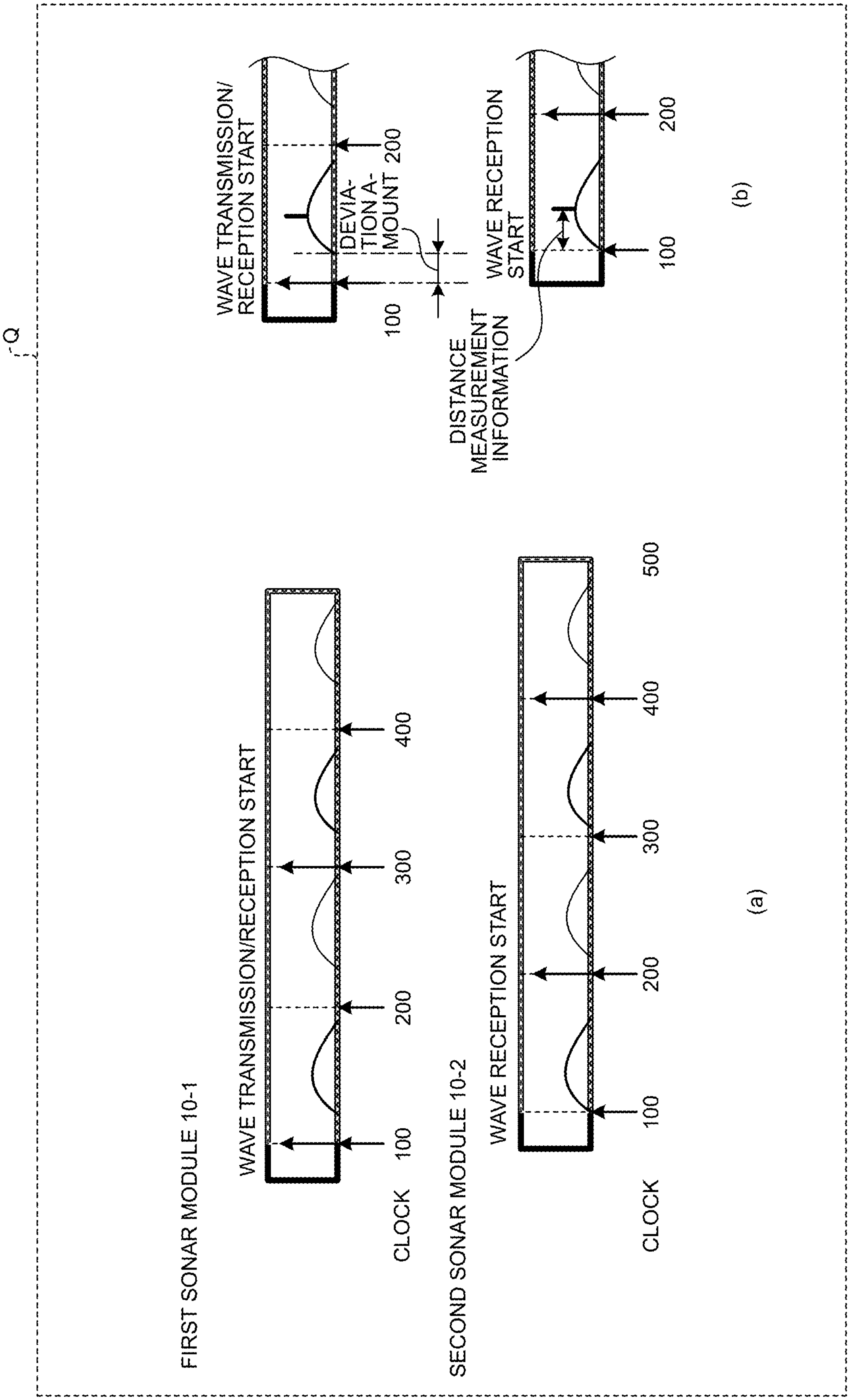
FIG. 7 is an explanatory diagram illustrating a process of a correction circuit of the third modification of the object detection device according to the embodiment.

FIG. 7 is a conceptual diagram Q illustrating an example of correction using two sonar modules 10 as an example.

Before correction, as illustrated in (a) of the conceptual diagram Q, the correction circuit 160 receives the timing of the wave transmission/reception start from the first sonar module 10-1 of which the time is adjusted and receives the timing of the wave transmission/reception start from the second sonar module 10-2. In addition, the correction circuit 160 receives the distance measurement information from the first sonar module 10-1 and the second sonar module 10-2.

In the first sonar module 10-1 and the second sonar module 10-2, there is a deviation in the timing of the start time received by the ECU 15 with respect to the distance measurement information output from each sonar module. When object detection is performed as it is, the distance to an object detected by the first sonar module 10-1 and the distance to an object detected by the second sonar module 10-2 are calculated with a deviation therebetween.

The correction is described in (b) of the conceptual diagram Q. The correction circuit 160 calculates the deviation amount of a signal waveform in a time axis direction based on the difference between the timings of the start time respectively received by the first sonar module 10-1 and the second sonar module 10-2. Then, the correction circuit 160 corrects the deviation of the distance measurement information by using the deviation amount. In the example illustrated in (b) of the conceptual diagram Q, the start time of the distance measurement information by the first sonar module 10-1 is earlier than the start time of the distance measurement information of the second sonar module 10-2. Therefore, the correction circuit 160 calculates the deviation amount and corrects the start time of the distance measurement information of the first sonar module 10-1 so that the start time of the distance measurement information of the first sonar module 10-1 is aligned with the start time of the distance measurement information of the second sonar module 10-2. By the correction, the object detection circuit 150 can set a distance from the position of the corrected start time to a peak of the waveform as the distance to the object and detect accurate coordinates of the object by triangulation by using the distance measurement information of the first sonar module 10-1 and the distance measurement information of the second sonar module 10-2.

Effect of Third Modification

As described above, since the correction circuit 160 is provided in the ECU 15, the object detection device 4 according to the third modification can also correct the time deviation of the start time with respect to the distance measurement information and can accurately detect the coordinates of the object by triangulation.

Fourth Modification of Embodiment

As an object detection device 5 according to a fourth modification of the embodiment, a configuration in which a zone ECU that bundles interfaces of the modules for each zone in front, rear, left, right, and the like of the vehicle 1000 is provided, and each zone ECU and the ECU 15 in the center are connected by a first interface is described.

Figure 1B:
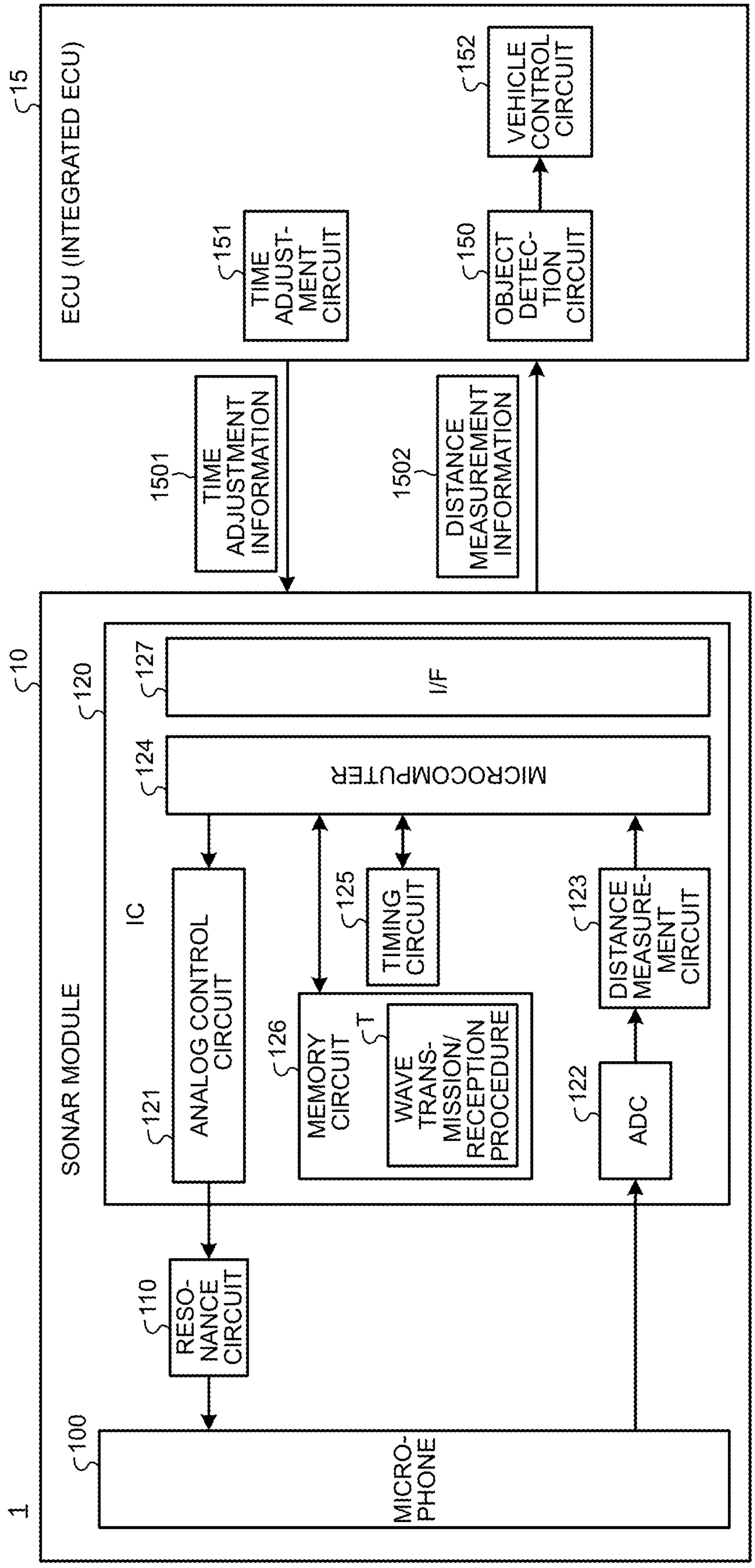
FIG. 1B is a diagram illustrating an example of a configuration of the object detection device according to the embodiment.

As illustrated in FIG. 1A, many modules such as the camera module 20 and the radar module 30 are connected to the integrated ECU 15 in addition to the sonar module 10. The sonar module 10, the camera module 20, and the radar module 30 have different interfaces (IF). Therefore, in the object detection device 5 according to the fourth modification of the embodiment, a zone ECU 50 that bundles the IFs of the modules is provided for each zone around the vehicle 1000 and the ECU 15 in the center is connected by the IF of each zone ECU 50. The IF of the zone ECU 50 corresponds to a first interface in which different interfaces are integrated.

Figure 8A:
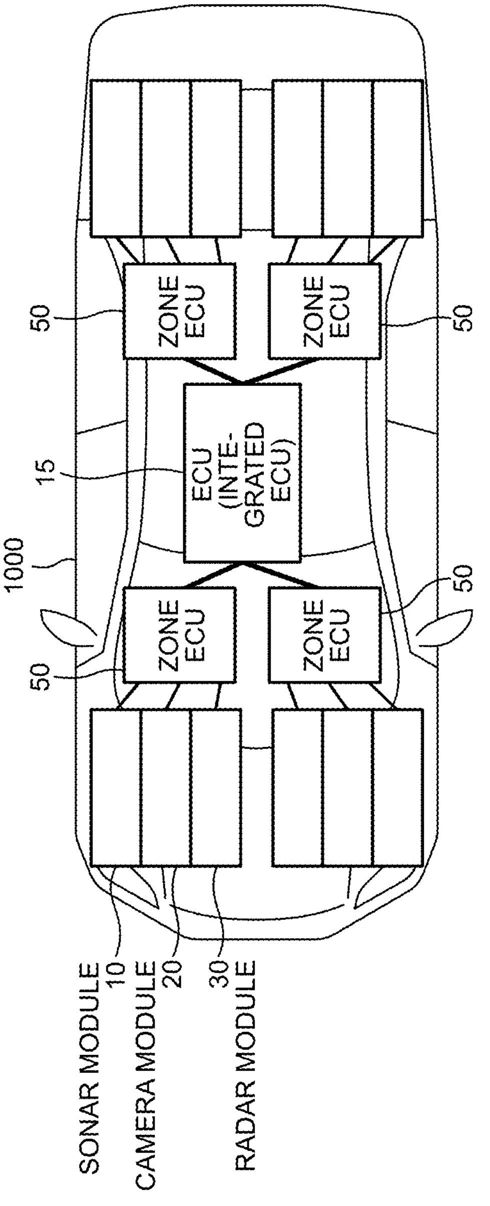
FIG. 8A is a diagram illustrating an example of an arrangement configuration of a zone ECU of a vehicle to which the configuration of a fourth modification of the object detection device according to the embodiment is applied.

As illustrated in FIG. 8A, the vehicle 1000 of an example in which the object detection device 5 is applied is divided into four of front, rear, left, and right zones, and the zone ECU 50 is provided in each of the four zones. By connecting the sonar module 10, the camera module 20, and the radar module 30 belonging to each zone to the zone ECU 50 corresponding to the zone, different IFs are integrated, and each zone ECU 50 and the ECU 15 in the center are connected by the IF of the zone ECU 50.

Figure 8B:
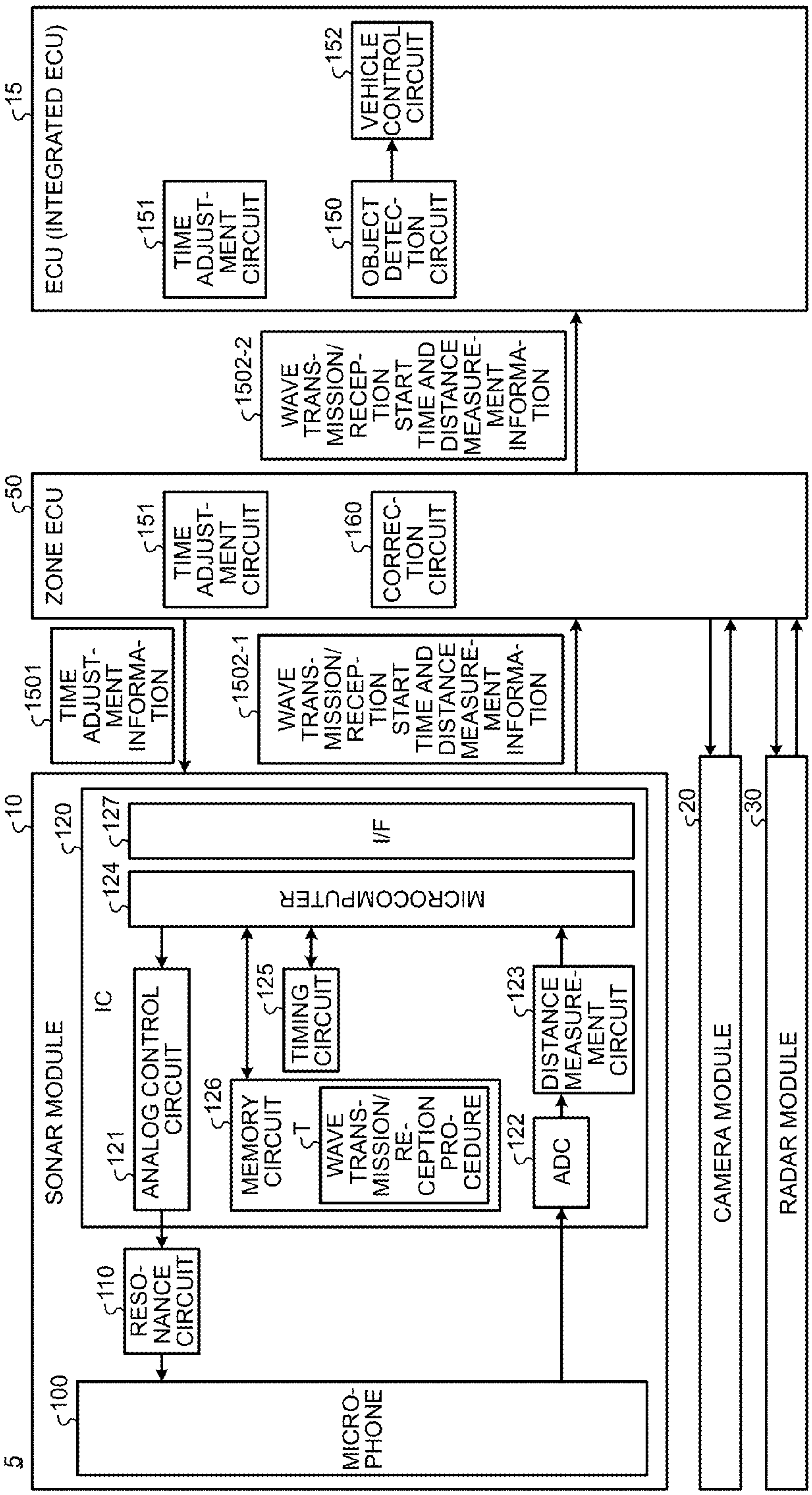
FIG. 8B is a diagram illustrating an example of a configuration of the fourth modification of the object detection device according to the embodiment.

A configuration of the object detection device 5 according to the fourth modification is more specifically described with reference to FIG. 8B. As illustrated in FIG. 8B, the zone ECU 50 is configured in the object detection device 5. Note that other configurations are described in the embodiment or the modifications, and thus repeated description is omitted.

The zone ECU 50 is an ECU mainly performing IF conversion. The zone ECU 50 is individually connected to the sonar module 10, the camera module 20, and the radar module 30 via harnesses and communicates with the sonar module 10, the camera module 20, and the radar module 30 via respective IFs. In addition, the zone ECU 50 is connected to the ECU 15 in the center by the integrated IF and performs communication. The zone ECU 50 exchanges signals between the respective IFs of the sonar module 10, the camera module 20, and the radar module 30 and the integrated IF by IF conversion.

Furthermore, in the example illustrated in FIG. 8B, the zone ECU 50 includes the time adjustment circuit 151 and is configured to transmit the time adjustment information 1501 from the time adjustment circuit 151 to the sonar module 10. Furthermore, the zone ECU 50 includes the correction circuit 160 and is configured to receive the start time of wave transmission/reception and distance measurement information 1502-1 from the sonar module 10 to perform time deviation adjustment. In the configuration of the example, the correction information and the distance measurement information after time deviation adjustment by the correction circuit 160 can be output from the zone ECU 50 to the ECU 15 instead of the start time of wave transmission/reception and distance measurement information 1502-2.

Although FIG. 8B illustrates an example in which the time adjustment circuit 151 and the correction circuit 160 are provided in the zone ECU 50, all or a part of the time adjustment circuit 151 and the correction circuit 160 may be provided in the ECU 15.

Although FIG. 8B illustrates the configuration in which one sonar module 10, one camera module 20, and one radar module 30 are connected to one zone ECU 50, the number of connections of the modules to one zone ECU 50 of the vehicle 1000 is not limited to one as illustrated in the example. For example, a plurality of sonar modules 10, a plurality of camera modules 20, and a plurality of radar modules 30 may be connected to one zone ECU 50.

In addition, even when the zone ECU 50 is provided, the contents of processing in the ECU 15 in the center may be the same. Complex signal processes such as object detection and vehicle control may be performed by the ECU 15 in the center. The time adjustment function may also be performed by the ECU 15 in the center but may be performed by the zone ECU 50 because the process is simple.

Effect of Fourth Modification

In the object detection device 5 according to the fourth modification of the embodiment, IFs of modules such as a sonar, a camera, and a radar are integrated by the zone ECU 50, and a signal is caused to flow between the zone ECU 50 and the ECU 15 in the center by the integrated IF. Therefore, for example, one IF can be provided between the zone ECU 50 and the ECU 15 in the center. In addition, it is also possible to reduce the harness in the vehicle and integrate the IF between the zone ECU 50 and the ECU 15 in the center by in-vehicle ETHER (registered trademark).

Although the embodiments and the modifications of the present disclosure are described, the embodiments and the modifications are presented as examples and are not intended to limit the scope of the disclosure. The embodiments can be implemented in various other forms, and various omissions, substitutions, and changes can be made without departing from the gist of the disclosure. The embodiments and the modifications thereof are included in the scope and gist of the disclosure and are included in the disclosure described in the claims and equivalent scope thereof.

In addition, the notation of " . . . circuit (circuitry)" in the above-described embodiments may be replaced with another notation such as " . . . assembly", " . . . device", " . . . unit", or " . . . module".

In each of the above embodiments, the present disclosure is described as an example of a configuration using hardware, but the present disclosure can also be realized by software in cooperation with hardware.

Also, each functional block used in the description of each of the above embodiments is typically realized as an LSI which is an integrated circuit. The integrated circuit may control each functional block used in the description of the above embodiments and include an input terminal and an output terminal. The functional blocks may be individually formed into one chip or may be formed into one chip to include a part or all of the functional blocks. Although the LSI is used herein, the integrated circuit may be referred to as an IC, a system LSI, a super LSI, or an ultra LSI depending on the degree of integration.

In addition, a circuit integration method is not limited to an LSI and may be realized using a dedicated circuit or a general-purpose processor and a memory. A field programmable gate array (FPGA) that can be programmed after manufacturing of the LSI or a reconfigurable processor in which connections or settings of circuit cells inside the LSI can be reconfigured may be used.

Furthermore, when a circuit integration technology replacing the LSI appears due to the progress of the semiconductor technology or another derived technology, it is obvious that the functional blocks may be integrated by using the technology. Application of biotechnology and the like is likely.

Note that the comprehensive or specific aspects may be realized by a system, a method, an integrated circuit, a computer program, or a recording medium, or may be realized by any combination of a system, a device, a method, an integrated circuit, a computer program, and a recording medium.

According to the present disclosure, it is possible to provide a technique for a plurality of wave transmission/reception circuits to transmit and receive ultrasonic waves or the like while autonomously aligning start timings.

Further advantages and effects of one aspect of the present disclosure are apparent from the specification and drawings. Such advantages and/or effects are each provided by several embodiments and features described in the specification and drawings, but not all the advantages and/or effects are necessarily provided to obtain one or more identical features.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

What is claimed is:

1. An object detection device comprising:

a plurality of wave transmission/reception circuits which, in operation, detects a received wave transmitted to and reflected from an object; and a processing circuit connected to the plurality of wave transmission/reception circuits, each of the plurality of wave transmission/reception circuits comprising:

a timing circuit which, in operation, adjusts time based on time adjustment information, and outputs the adjusted time;

a wave transmission/reception control circuit which, in operation, performs wave transmission or wave reception based on the adjusted time outputted by the timing circuit; and a communication circuit which, in operation, communicates with another wave transmission/reception circuit of the plurality of wave transmission/reception circuits, and the processing circuit comprising:

an output circuit which, in operation, outputs the time adjustment information for adjusting time to a first wave transmission/reception circuit of the plurality of wave transmission/reception circuits and does not output the time adjustment information to remaining wave transmission/reception circuits of the plurality of wave transmission/reception circuits; and an object detection circuit which, in operation, detects the object by using distance measurement information based on the wave transmission and the wave reception input from the plurality of wave transmission/reception circuits, wherein the first wave transmission/reception circuit includes a first communication circuit which, in operation, transmits the time adjustment information to the remaining wave transmission/reception circuits.

2. The object detection device according to claim 1, wherein the processing circuit includes a correction circuit which, in operation, corrects a deviation of the distance measurement information input from the plurality of wave transmission/reception circuits.

3. The object detection device according to claim 1, wherein the processing circuit includes a vehicle control circuit which, in operation, controls a vehicle in which the object detection device is installed, and the vehicle control circuit, in operation, controls the vehicle based on an output result of the object detection circuit.

4. The object detection device according to claim 1, wherein the object detection device further includes a plurality of other modules having different interfaces from the plurality of wave transmission/reception circuits, the plurality of wave transmission/reception circuits are modules used for detection of the object, the processing circuit includes:

a plurality of zone ECUs (electronic control units) to which the plurality of modules are connected, the plurality of zone ECUs being provided for each zone of a vehicle in which the object detection device is installed; and an ECU that is connected to the plurality of zone ECUs, each of the plurality of zone ECUs includes the timing circuit, and the ECU includes the object detection circuit.

5. The object detection device according to claim 4, wherein each of the plurality of zone ECUs includes a correction circuit which, in operation, outputs correction information related to correction of a deviation of the distance measurement information input from a corresponding one of the plurality of wave transmission/reception circuits, and the ECU detects the object by using the correction information and the distance measurement information input from each of the plurality of zone ECUs.

6. An object detection device comprising:

a plurality of wave transmission/reception circuits which, in operation, detects a received wave transmitted to and reflected from an object; and a processing circuit connected to the plurality of wave transmission/reception circuits, each of the plurality of wave transmission/reception circuits comprising:

a timing circuit which, in operation, adjusts time based on time adjustment information, and outputs the adjusted time;

a wave transmission/reception control circuit which, in operation, performs wave transmission or wave reception based on the adjusted time outputted by the timing circuit; and the processing circuit comprising:

an output circuit which, in operation, outputs the time adjustment information for adjusting time to a first wave transmission/reception circuit of the plurality of wave transmission/reception circuits and does not output the time adjustment information to remaining wave transmission/reception circuits of the plurality of wave transmission/reception circuits; and an object detection circuit which, in operation, detects the object by using distance measurement information based on the wave transmission and the wave reception input from the plurality of wave transmission/reception circuits, wherein the first wave transmission/reception circuit includes:

a first timing circuit which, in operation, outputs a first adjusted time based on the time adjustment information; and a first wave transmission/reception control circuit which, in operation, performs wave transmission based on the first adjusted time outputted by the first timing circuit, and a second wave transmission/reception circuit of the remaining wave transmission/reception circuits includes:

a wave detection circuit which, in operation, detects the wave transmission by the first wave transmission/reception circuit;

a second timing circuit which, in operation, adjusts time of the second timing circuit, the adjustment of the time of the second timing circuit being triggered by the detection, by the wave detection circuit, of the wave transmission by the first wave transmission/reception circuit, and a second wave transmission/reception control circuit which, in operation, performs wave transmission or wave reception based on the adjusted time of the second timing circuit.

7. The object detection device according to claim 6, wherein the processing circuit includes a correction circuit which, in operation, corrects a deviation of the distance measurement information input from the plurality of wave transmission/reception circuits.

8. The object detection device according to claim 6, wherein the processing circuit includes a vehicle control circuit which, in operation, controls a vehicle in which the object detection device is installed, and the vehicle control circuit, in operation, controls the vehicle based on an output result of the object detection circuit.

9. The object detection device according to claim 6, wherein the object detection device further includes a plurality of other modules having different interfaces from the plurality of wave transmission/reception circuits, the plurality of wave transmission/reception circuits are modules used for detection of the object, the processing circuit includes:

a plurality of zone ECUs (electronic control units) to which the plurality of modules are connected, the plurality of zone ECUs being provided for each zone of a vehicle in which the object detection device is installed; and an ECU that is connected to the plurality of zone ECUs, each of the plurality of zone ECUs includes the timing circuit, and the ECU includes the object detection circuit.

10. An object detection method of detecting an object by an object detection device including a processing circuit connected to a plurality of wave transmission/reception circuits, the method comprising:

outputting, by the processing circuit, time adjustment information used for adjusting time of a first timing circuit included in a first wave transmission/reception circuit of the plurality of wave transmission/reception circuits, the processing circuit not outputting the time adjustment information to remaining wave transmission/reception circuits of the plurality of wave transmission/reception circuits;

adjusting, by the first timing circuit included in the first wave transmission/reception circuit, the time of the first timing circuit based on the time adjustment information;

transmitting, by a first communication circuit included in the first wave transmission/reception circuit, the time adjustment information to remaining communication circuits included in the remaining wave transmission/reception circuits;

receiving, by remaining timing circuits included in the remaining wave transmission/reception circuits, the time adjustment information from the first communication circuit;

adjusting, by the remaining timing circuits included in the remaining wave transmission/reception circuits, the time of the remaining timing circuits based on the time adjustment information from the first communication circuit;

performing, by the plurality of wave transmission/reception circuits, wave transmission or wave reception based on the adjusted time; and detecting, by the processing circuit, the object by using distance measurement information based on the wave transmission and the wave reception input from the plurality of wave transmission/reception circuits.

11. The object detection method according to claim 10, further comprising correcting, by a correction circuit included in the object detection device, a deviation of the distance measurement information input from the plurality of wave transmission/reception circuits.

12. The object detection method according to claim 10, further comprising controlling, by a vehicle control circuit included in the processing circuit, a vehicle in which the object detection device is installed based on an output result of the object detection device.

13. The object detection method according to claim 10, wherein the object detection device further includes a plurality of other modules having different interfaces from the plurality of wave transmission/reception circuits, the plurality of wave transmission/reception circuits are modules used for detection of the object, the processing circuit includes:

a plurality of zone ECUs (electronic control units) to which the plurality of modules are connected, the plurality of zone ECUs being provided for each zone of a vehicle in which the object detection device is installed; and an ECU that is connected to the plurality of zone ECUs, each of the plurality of zone ECUs includes the timing circuit, and the ECU includes the processing circuit.

14. The object detection method according to claim 13, further comprising:

outputting, by a correction circuit included in each of the plurality of zone ECUs, correction information related to correction of a deviation of the distance measurement information input from a corresponding one of the plurality of wave transmission/reception circuits; and detecting, by the ECU, the object by using the correction information and the distance measurement information input from each of the plurality of zone ECUs.

15. An object detection method of detecting an object by an object detection device including a processing circuit connected to a plurality of wave transmission/reception circuits, the method comprising:

outputting, by the processing circuit, time adjustment information for adjusting time of a first timing circuit included in a first wave transmission/reception circuit among the plurality of wave transmission/reception circuits, the processing circuit not outputting the time adjustment information to remaining wave transmission/reception circuits of the plurality of wave transmission/reception circuits;

adjusting, by the first timing circuit included in the first wave transmission/reception circuit, the time of the first timing circuit based on the time adjustment information;

outputting, by the first timing circuit included in the first wave transmission/reception circuit, a first adjusted time based on the time adjustment information;

performing, by a first wave transmission/reception control circuit included in the first wave transmission/reception circuit, wave transmission based on the first adjusted time outputted by the first timing circuit;

detecting, by a wave detection circuit included in a second wave transmission/reception circuit of the remaining wave transmission/reception circuits, the wave transmission by the first wave transmission/reception circuit; and adjusting, by a second timing circuit included in the second wave transmission/reception circuit, time of the second timing circuit, the adjusting of the time of the second timing circuit being triggered by the detecting, by the wave detection circuit, of the wave transmission by the first wave transmission/reception circuit.

* * * * *